Feb. 7, 1933.  C. B. CLARK  1,896,287
MANUFACTURE OF SULPHURIC ACID
Filed Sept. 10, 1929
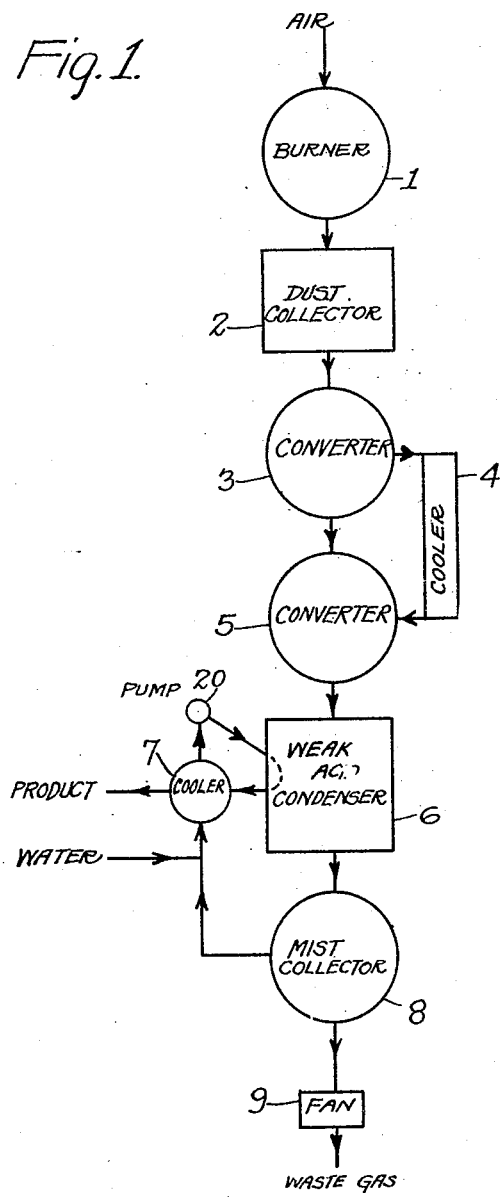
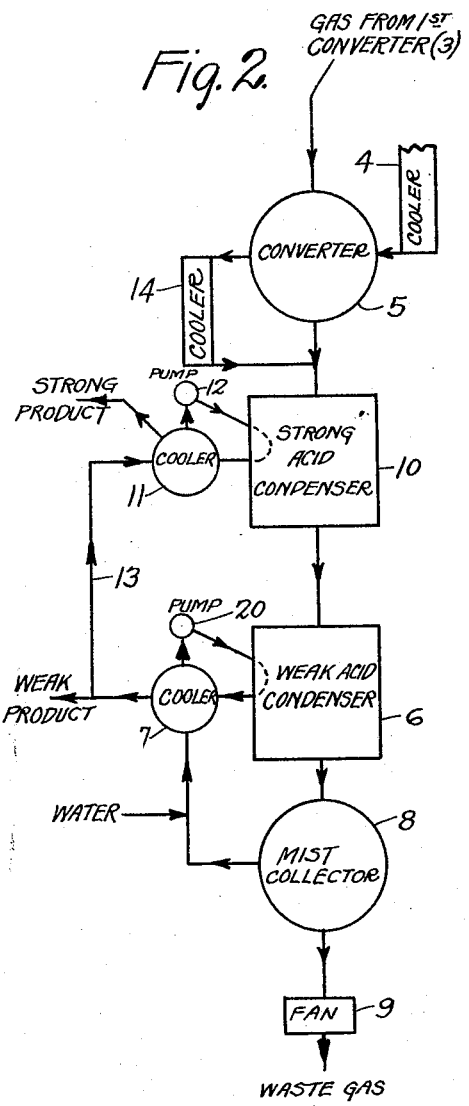
Inventor
CYRIL B. CLARK
By His Attorney
Philip B. Reck Patented Feb. 7, 1933

1,896,287

UNITED STATES PATENT OFFICE

CYRIL B. CLARK, OF SCARSDALE, NEW YORK, ASSIGNOR TO CATALYTIC PROCESS CORPORATION, OF NEW YORK, N. Y., A CORPORATION OF DELAWARE

MANUFACTURE OF SULPHURIC ACID

Application filed September 10, 1929. Serial No. 391,576.

My invention relates more particularly to improved methods for the production of sulphuric acid and sulphur trioxide by the contact sulphuric acid process in which the catalyst employed is not poisoned by the ordinary gaseous poisons, such as arsenic, hydrochloric acid, chlorine, solenium etc. arising from burning or roasting a sulphur containing material as pyrite to produce sulphur dioxide. As an example of the type of catalyst preferably used in my methods, I refer to the forms of vanadium catalysts described in the two U. S. patents to Jaeger No. 1,675,308 of June 26, 1928 and No. 1,694,123 of December 4, 1928.

In the customary practice in such contact processes the gases are suitably dried before they pass to the converter system so as to prevent condensation of sulphuric acid and corrosion of equipment at points in the system where sulphur trioxide $SO_3$ is present with water vapor, and the temperature is below the condensing point of sulphuric acid. Furthermore the gases are usually dried to aid in absorption of $SO_3$ since such gases containing moisture are difficult to absorb.

Heretofore it has been common practice to absorb the $SO_3$ in strong sulphuric acid, the gases being brought into contact in the final absorption tower with acid of 98–99% strength. It is difficult to maintain the absorbing acid at the exact strength required, and for this reason some of the $SO_3$ gas is frequently lost in the waste gas.

According to my improved methods I have eliminated the necessity for drying the gas coming from the burners and also the requirement of maintaining a constant strength acid in the final absorption tower just mentioned. I have discovered new and improved methods for condensing sulphur trioxide ($SO_3$) from undried gases containing water vapor which is drawn into the burners from the atmosphere under ordinary operating conditions by contacting the $SO_3$ gas with sulphuric acid having a higher aqueous vapor pressure than 98% acid to partly absorb the $SO_3$ and also humidify the balance of the $SO_3$ so that it may be thereafter condensed in a mist collector and recovered.

My improved methods of operation are shown in the accompanying drawing in which—

Fig. 1 is a diagrammatic illustration of the apparatus required for the various major steps of the process to be carried out when used for the manufacture of fertilizer acid of 50° to 60° Baumé.

Fig. 2 is a diagrammatic illustration of a modification of the apparatus shown in Fig. 1, which is adapted for the production of sulphuric acid of 98% strength or greater.

Similar reference numerals indicate the same parts in both figures.

Referring to Fig. 1, the gases from the burner 1 pass through the dust collector 2 and then into the first converter 3 in which a large part of the sulphur dioxide ($SO_2$) will be converted into $SO_3$. The gas from the converter 3 is cooled in the cooler 4 and then passes on through the converter 5 in which the balance of the $SO_2$ is converted into sulphur trioxide ($SO_3$). The converters 3 and 5 are preferably of the self-cleaning type such as are set forth in my co-pending application for patent Serial No. 390,509, filed September 5th, 1929. The small amount of dust in the gases issuing from the dust collector 2 is removed in the two converters 3 and 5.

The temperature of the gas from the converter 5 will be above the condensation point of sulphuric acid, and the gas is passed at about 600° F. or over directly to the condensing tower or condenser 6. Acid is circulated by the pump 20 over the tower 6 to absorb and condense the greater part of the acid, the acid being cooled in the cooler 7 to remove the heat from reaction in the condensation of the $SO_3$ in the tower 6 and also from the gas.

It is known that the amount of SO₃ absorbed depends upon the strength of acid used in the tower 6, other conditions being the same. The relative absorption where a gas containing 5% sulphur trioxide (SO₃) is used is given approximately as follows:—

| Strength absorbing acid | Per cent of SO₃ absorbed |
|---|---|
| Per cent | |
| 99.1 | 99.1 |
| 90.0 | 97.6 |
| 85.2 | 93.6 |
| 80.6 | 89.0 |
| 75.3 | 82.0 |
| 71.0 | 72.6 |

With 99% strength acid in the tower 6 practically all of the SO₃ will be absorbed if the gas has been previously dried. When using undried gases, such for example, as contain at least 5% by volume of SO₃ and 0.20 pounds of water vapor per 1000 cubic feet of gas, a sulphuric acid mist will be formed in the condenser 6 which will not be absorbed in this condenser. With decreasing strengths of absorbing acid in the tower 6, the amount of such mist formed will gradually increase due to the increasing aqueous vapor pressure of the absorbing acid.

Usually it is necessary to produce 98 to 99% acid in the tower 6, and then dilute such acid where a weaker acid is desired; this requires special equipment for cooling the diluted acid. According to my improved methods I make directly the sulphuric acid of the strength desired.

For example, if 60° Bé. acid (77.67%) is desired, I circulate this strength acid over the condensing tower 6, and under these conditions about 85% of the SO₃ will be absorbed and the balance (15%) will be humidified and condensed in the mist collector 8 from which such recovered acid is returned to the cooler 7 and added to the acid in circulation in the tower 6. Water is added to such acid in circulation as required to maintain such acid at the desired strength. The acid product as made is drawn off from the cooler 7, and the fan 9 acts to draw the gas through the system as shown.

According to my improved process as described and shown in Fig. 1, any strength acid up to 98% strength can be produced, and the customary steps of drying the gases from the burner, and then diluting the absorbing acid to make the product of the required strength are dispensed with.

A modification of this process which is particularly adapted for the production of sulphuric acid of greater strength than 98% is diagrammatically shown in Fig. 2.

A strong acid condenser 10 is placed in the line between the converter 5 and the weak acid condenser 6. Oleum is circulated over this condenser tower 10 and cooler 11 by the pump 12 by which the oleum absorbs a part of the sulphur trioxide (SO₃), while weak acid from the condenser 6 passes from the cooler 7 through the pipe 13 to dilute the acid made on the condenser 10. By such methods oleum of various grades can be produced and then drawn off from the cooler 11. The gas from the converters 3 and 5 will contain at least 5% by volume of SO₃, and also water vapor to the extent of about 0.20 lbs. or more per 1000 cubic feet of gas. The cooler 14 is placed between the converter 5 and condenser to partially cool the oncoming gas, and weak acid product may be drawn off from the cooler 7 as in the Fig. 1 apparatus, if desired.

I claim as my invention:

1. In the manufacture of sulphuric acid from undried burner gases, the steps in condensing sulphur trioxide from said gases which comprise contacting such undried burner gases with sulphuric acid of predetermined strength to partly absorb the sulphur trioxide, and humidifying substantially all the unabsorbed sulphur trioxide and condensing same to acid.

2. In the manufacture of sulphuric acid from undried burner gases, the steps in condensing sulphur trioxide from said gases which comprise contacting such undried burner gases with sulphuric acid of predetermined strength to partly absorb the sulphur trioxide, humidifying substantially all the unabsorbed sulphur trioxide and condensing same to acid, and returning such condensed acid directly to the acid of predetermined strength.

3. In a manufacture of sulphuric acid from undried burner gases, the steps in condensing sulphur trioxide from said gases which comprise contacting such undried burner gases with sulphuric acid of predetermined strength to partly absorb the sulphur trioxide, humidifying substantially all the unabsorbed sulphur trioxide and condensing same to acid, and diluting and returning such condensed acid directly to the acid of predetermined strength.

4. In the manufacture of sulphuric acid from undried burner gases, the steps in condensing sulphur trioxide from said gases which comprise bringing such undried burner gases into contact with sulphuric acid of predetermined strength in circulation to partly absorb the sulphur trioxide, humidifying substantially all the unabsorbed sulphur trioxide and condensing same to acid, and returning such condensed acid directly to the acid in circulation.

5. In the manufacture of sulphuric acid from undried burner gases, the steps in condensing sulphur trioxide from said gases which comprise bringing such undried burner gases into contact with sulphuric acid of predetermined strength in circulation to partly absorb the sulphur trioxide, humidifying substantially all the unabsorbed sulphur trioxide and condensing same to acid, and diluting and returning such condensed acid directly to the acid in circulation to maintain the acid in circulation at predetermined strength.

6. In the manufacture of sulphuric acid from undried burner gases, the steps in condensing sulphur trioxide from said gases which comprise contacting such undried burner gases with sulphuric acid having a higher aqueous vapor pressure than 98% acid, and humidifying substantially all the unabsorbed sulphur trioxide and condensing same to acid.

7. In the manufacture of sulphuric acid, the process for condensing sulphur trioxide from undried gases containing at least 5% by volume of $SO_3$ and 0.20 pounds of water vapor per 1000 cubic feet, which comprises contacting said undried gases with sulphuric acid in circulation having a higher aqueous vapor pressure than 98% acid to partly absorb sulphur trioxide, and humidifying substantially all the unabsorbed sulphur trioxide and condensing same to acid.

8. In the manufacture of sulphuric acid, the process for condensing sulphur trioxide from undried gases containing at least 5% by volume of $SO_3$ and 0.20 pounds of water vapor per 1000 cubic feet, which comprises contacting said undried gases with sulphuric acid in circulation having a higher aqueous vapor pressure than 98% acid to partly absorb sulphur trioxide, humidifying substantially all the unabsorbed sulphur trioxide and condensing same to acid, and returning the condensed acid to the acid in circulation.

9. In the manufacture of sulphuric acid, the process for condensing sulphur trioxide from undried gases containing at least 5% by volume of $SO_3$ and 0.20 pounds of water vapor per 1000 cubic feet, which comprises contacting said undried gases with sulphuric acid in circulation having a higher aqueous vapor pressure than 98% acid to partly absorb sulphur trioxide, humidifying substantially all the unabsorbed sulphur trioxide and condensing same to acid, and diluting and returning the condensed acid to the acid in circulation.

10. In the manufacture of sulphuric acid of more than 98% strength from undried burner gases, the steps in condensing sulphur trioxide from said gases which comprise contacting such gases with oleum in circulation to absorb part of the sulphur trioxide, contacting the balance of sulphur trioxide with relatively weak acid to condense same, and returning such condensed acid to dilute the strong acid produced from the oleum in circulation.

CYRIL B. CLARK.